W. STELLARD.
SANITARY FLUID DISPENSING APPARATUS.
APPLICATION FILED JULY 8, 1911.
1,061,417.
Patented May 13, 1913.
3 SHEETS—SHEET 2.
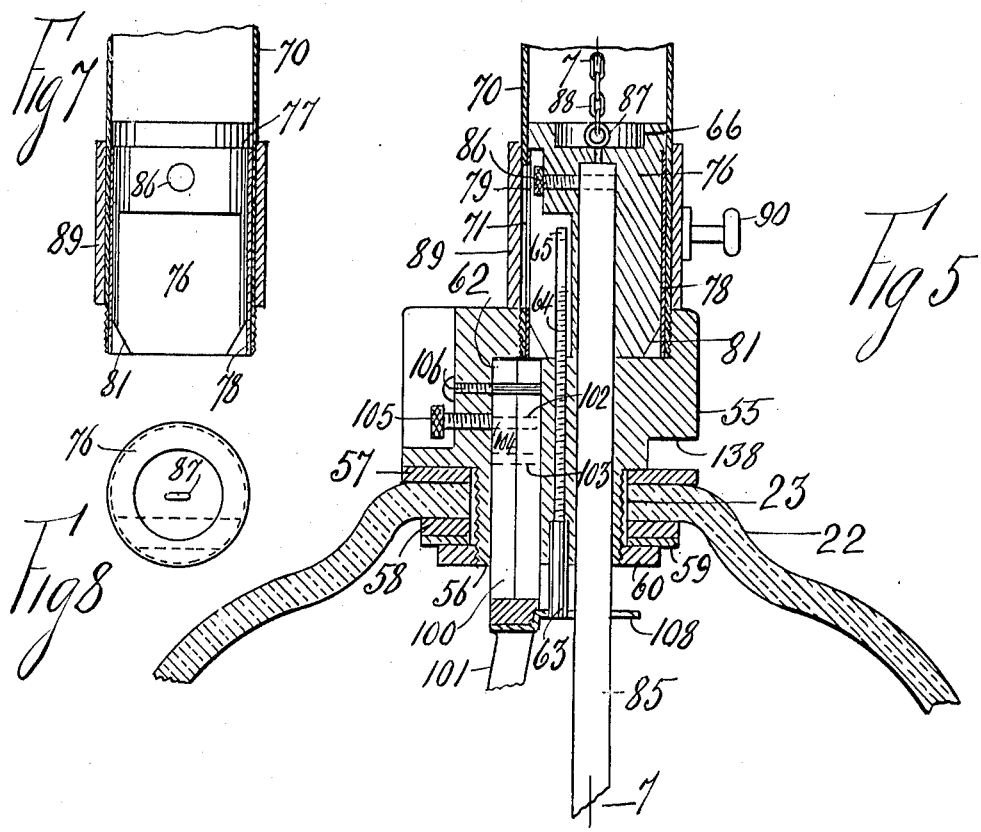
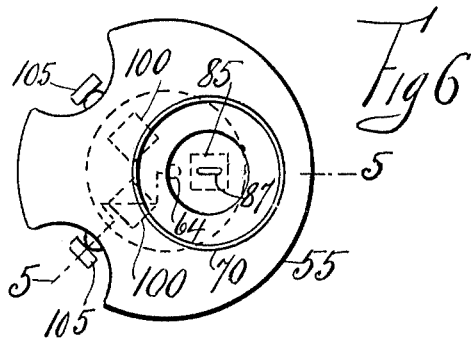
Witnesses:
David L. Ackerman
A. W. Baker
Inventor
Walter Stellard
By his Attorney
Aslde Bonneville

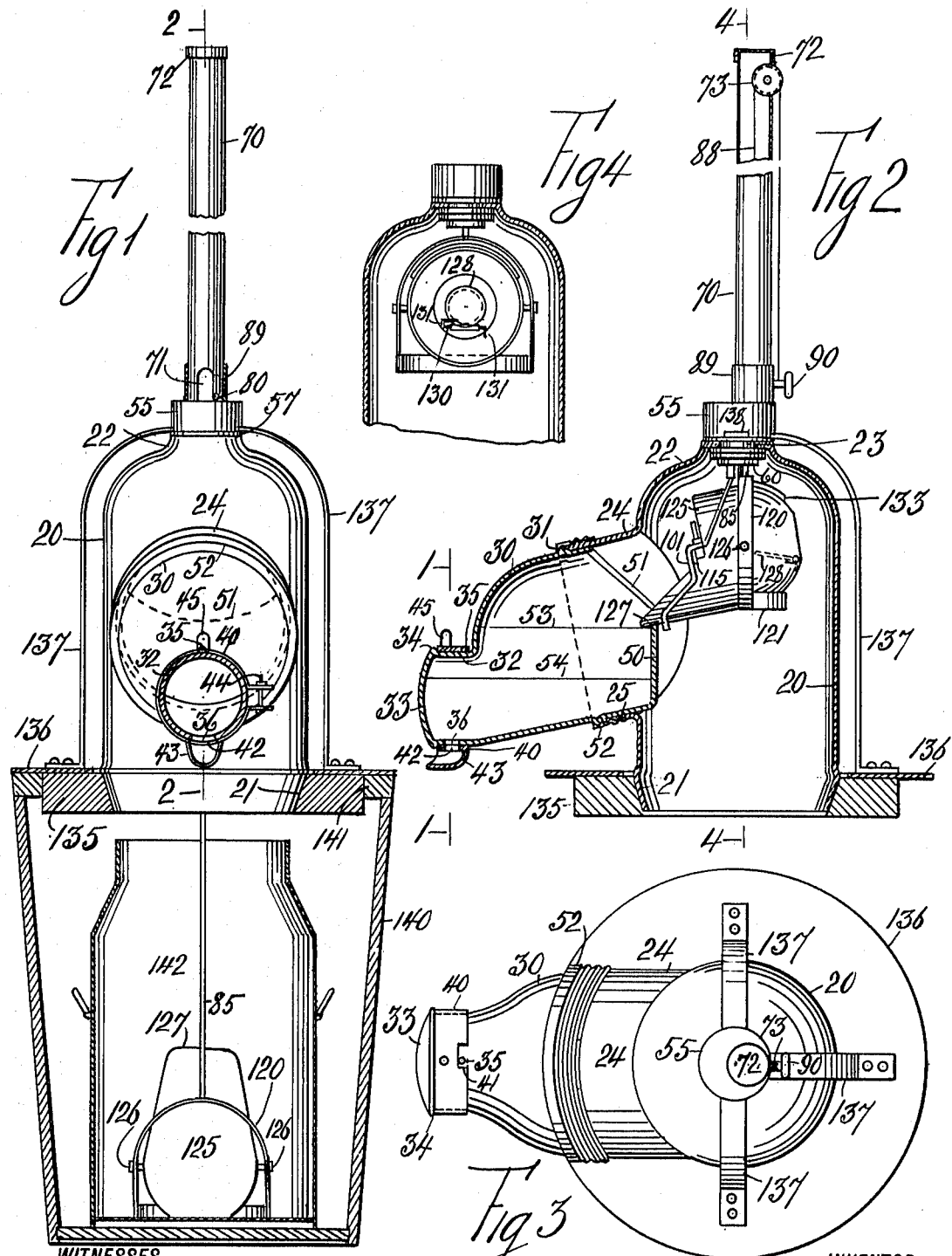

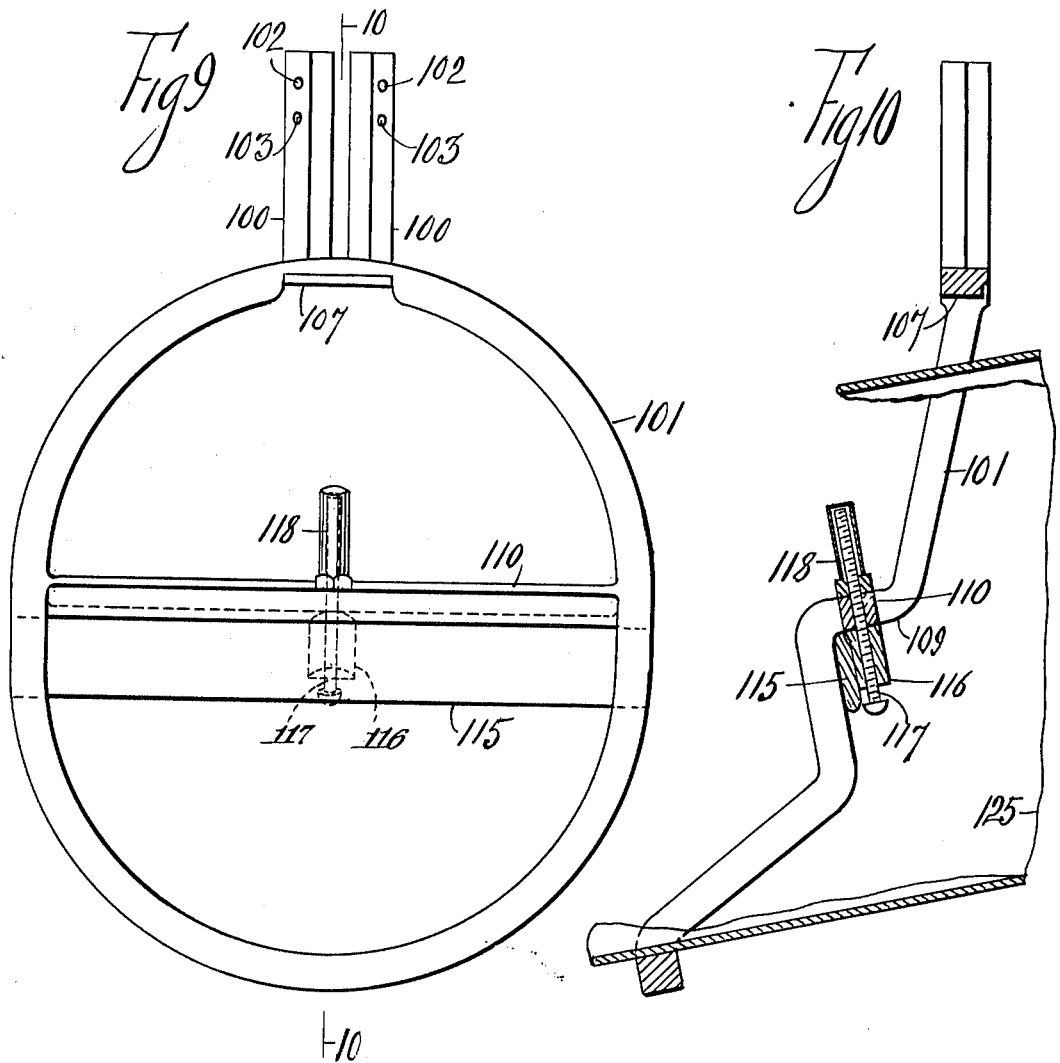

UNITED STATES PATENT OFFICE.

WALTER STELLARD, OF NEW YORK, N. Y., ASSIGNOR TO UNIVERSAL PAPER BOTTLE COMPANY, OF NEW YORK, N. Y., A CORPORATION OF DELAWARE.

SANITARY FLUID-DISPENSING APPARATUS.

1,061,417.      Specification of Letters Patent.      Patented May 13, 1913.

Application filed July 8, 1911. Serial No. 637,535.

*To all whom it may concern:*

Be it known that I, WALTER STELLARD, a subject of the Netherlands, and a resident of the borough of Bronx, in the county of New York and State of New York, have invented certain new and useful Improvements in Sanitary Fluid-Dispensing Apparatus, of which the following is a specification.

This invention relates to a sanitary fluid dispensing apparatus, and is an improvement of my invention for which I filed an application on or about September 10th, 1910, Serial No. 581,364.

The invention is characterized by sanitary means by which a fluid, milk and the like may be delivered in measured quantities from a can or tank without the fluid coming in contact with the operator. The can or reservoir is never open to the atmosphere while the fluid is taken therefrom, and said can or reservoir is contained in a closed vessel which may be packed with ice or other cooling agent, to maintain the fluid at a proper temperature at small cost.

In the accompanying drawings, Figure 1 shows a front view of an apparatus exemplifying the invention, with a section taken on the line 1, 1, of Fig. 2 and an axial vertical section of the lower portion of the invention, Fig. 2 represents a partial section of Fig. 1 on the line 2, 2, Fig. 3 is a top plan view of the apparatus, Fig. 4 shows a partial section of Fig. 2 on the line 4, 4, Fig. 5 represents an enlarged partial section of the invention taken on a broken line as 5, 5 of Fig. 6, Fig. 6 is a partial top plan view of Fig. 5, Fig. 7 represents a partial section of the upper portion of Fig. 5 on the line 7, 7, Fig. 8 is a partial top plan view of Fig. 7, Fig. 9 shows an enlarged front view of the tilting frame, and Fig. 10 represents a section of Fig. 9 on the line 10, 10.

The invention is shown to comprise a receptacle 20 that has formed therewith the tapered lower portion 21, the neck 22 with the opening 23, and the inclined discharging barrel 24 having threads 25 formed on the outer surface thereof. A measuring vessel 30 is supported in the discharging barrel, a shoulder 31 on said vessel 30 bearing against the outer edge of the barrel 24. With the vessel 30 is formed the cylindrical spout 32, having the end wall 33 with the flange 34, the stop boss 35 and the discharge opening 36 in the lower portion thereof. A band 40 with notch 41, opening 42 and handle 45 encircles the spout 32, the said notch being in the path of the stop boss 35, and the opening 42 being in the path of the opening 36. A secondary spout 43 extends below the opening 42 of the said band.

The ends of the band 40 are engaged by the clamping bolt 44. The measuring vessel 30 has formed therewith the rear wall 50 with the opening 51. A threaded clamping ring 52 engages the threads 25 and the shoulder 31 to securely clamp the measuring vessel 30 in place in the barrel 24. Index lines 53 and 54 are formed on the walls of the vessel 30 to measure the quantity of fluid therein.

A stopper designated generally by the numeral 55 has formed therewith a threaded barrel 56 that enters the opening 23 of the neck 22. A washer 57 of pliable material, preferably rubber, is located around the barrel 56 between the shoulder of the stopper formed by said barrel and the top face of the neck 22. A similar washer 58 of pliable material surrounds said barrel and bears up against the lower face of the neck 22. A washer 59 of same hard material bears up against the pliable washer 58 and a nut 60 engages the threaded barrel 56 and bears up against the washer 59.

A pair of rectangular cavities like 62 are formed in the stopper 55 to support an adjustable tilting frame to be described. An adjustable stop 63 with the stem 64, and slotted head 65 is in threaded engagement with said stopper. A square cavity 66 is formed in said stopper for a stem to be described.

In the upper portion of the stopper is secured a tubular guide 70 with an opening 71 in the lower portion thereof, and a cap 72 at its upper end. A guide sheave 73 is journaled at the upper end of the said tubular guide. A cross head 76 is located within the tubular guide and is shouldered at 77 for a dust sleeve 78 that has an opening 79 that can register with the opening 71 in tubular guide 70. A button 80 extends from the sleeve 78 so as to locate it in different positions. The cross head 76 is tapered at its lower end as shown at 81. It has an axial square opening in which is located the square lifting rod 85 of the dipper to be described, said rod being clamped in place by means of the screw 86. An eye bolt 87 fastened in the upper end of the cross head has extending therefrom a chain or band 88 that leads over the sheave 73. A sleeve 89 encircles the tubular guide 70 and has extending therefrom the handle 90, to which latter one end of the chain or band 88 is fastened.

In the cavities 62 are located the rectangular stems 100 of the oval tilting frame 101. Each of the stems have a pair of openings 102, 103, for the shanks 104 of the suspending screws 105. Stop screws like 106 are in threaded engagement with the stopper 55 and extend into the cavities 62, just over the ends of the stems 100 when the latter are in their lowest position. The tilting frame 101 is notched at 107 for a cleaning washer 108 that encircles the lifting rod 85. The frame 101 is stepped at its sides as shown at 109 and said sides are connected by a cross bar 110. An adjustable tilting bar 115 bears against the rear side of the tilting frame and has extending therefrom a threaded boss 116, which carries in threaded engagement the screw 117, that extends through an opening in the cross bar 110. A cap nut 118 engages said screw and bears against the top face of the bar 110 to clamp the tilting bar 115 in different positions. The lower portion of the tilting frame supports the dipper when the latter is in proper position to discharge the fluid therefrom.

The lifting rod 85 has extending therefrom the bail 120 with the stop band 121 at the lower end thereof. The said rod is preferably rectangular in cross-section to prevent it from turning. A dipper 125 is suspended in the bail 120 by means of the trunnions 126. It has a nose 127 and in the bottom on the inside of said dipper is hinged a gravity swinging check valve 128. The hinge rod 130 of the check valve hinge has the legs 131, by means of which it is prevented from opening to a greater angle than shown in dotted lines in Fig. 2, so that when it descends it will close by gravity. A counter weight 133 is fastened to the dipper 125.

The receptacle 20 is supported in the wooden ring 135 having a tapered opening to suit the lower portion 21 of said receptacle. A metallic ring 136 is supported on the said wooden ring. Supporting braces 137 extend from notches 138 in the stopper 55 and bear on the ring 136 to prevent any excessive weight on or tremors to be transmitted to the receptacle 20. A vessel 140 is shown with the ring cover 141 on which is located the metallic ring 136. Within the vessel 140 is shown a reservoir or can 142 from which the fluid is to be dipped.

When the dipper is at the lower end of its stroke the sleeve 89 is at the op of its stroke, and by bearing on the handle 90 the said sleeve is brought to its lowest position which raises the bail 120 with the dipper 125. When the dipper comes in the path of the tilting bar 115 it is tilted and its contents are discharged into the measuring vessel 30, in which the lines 53 or 54 indicate the quantity that enters therein. The amount of fluid that is tilted into the vessel 30 can be varied, by locating the tilting bar 115 in different positions by means of the screw 117, and at the same time locating the tilting frame in proper position by inserting the screws 105 in the holes 102 or 103 of the stems 100, so as to cause the lower side of the nose of the dipper to always bear on the lower portion of the tilting frame, and the upper edges of said nose to bear against the lower edge of the tilting bar 115. This disposition of parts also prevents any oscillation of the dipper while it is discharging the fluid so as to empty said dipper of the desired quantity. The adjustable stop 63 determines the upper positions of the bail for discharging different quantities of the fluid from the dipper. To adjust the stop 63 the operator registers the opening 79 of the dust sleeve with the opening 71 in the tubular guide 70, after which the sleeve is turned to close said openings relatively to each other, to prevent any dust from entering the apparatus. It will be noted that the dipper 125 reaches the bottom of the can 142 and therefore completely empties the same. The measuring vessel 30 can be easily detached from the receptacle 20 so that the parts of the apparatus can be removed and cleaned. The washer 108 always keeps the lifting rod 85 free from any fluid before it travels through the stopper 55.

The band 40 may be located so that the openings 36 and 42 register with each other at any time, to drain the spout 32 of any fluid that may remain therein after use.

The receptacle 20 and measuring vessel 30 are preferably made of glass so that the interior thereof is in full view of the operator. By this means and the fact that the parts of the apparatus can be easily taken apart, secures among other things the sanitary feature of the invention.

Having described my invention what I desire to secure by Letters Patent and claim is:—

1. In a fluid dispensing apparatus the combination of a receptacle, a dipper slidably suspended therein, means to reciprocate the dipper, a reservoir below the receptacle to hold the fluid to be dispensed, and a tilting frame adjustably suspended in said apparatus in the path of the dipper to tilt the latter and thereby discharge a predetermined quantity of fluid therefrom.

2. In a fluid dispensing apparatus the combination of a receptacle, a measuring vessel detachably connected thereto, a spout extending from the measuring vessel, a dipper slidably suspended in the receptacle, means to reciprocate the dipper to dip into a fluid and means to tilt the dipper to different angles at the upper end of its stroke, to discharge the fluid into the measuring vessel in predetermined quantities.

3. In a fluid dispensing apparatus the combination of a receptacle, a dipper slidably suspended therein, a counter-weight for the dipper, a check valve connected to said dipper, means to reciprocate the dipper and thereby charge it with the fluid to be dispensed, an adjustable tilting frame for the dipper in said apparatus, the dipper maintaining an upright position during its reciprocations until tilted by said tilting frame.

4. In a fluid dispensing apparatus the combination of a receptacle, a measuring vessel extending therefrom, a spout with an opening extending from said measuring vessel, a stopper at the upper portion of the receptacle, a lifting rod guided in said stopper, a bail extending from said rod, a dipper pivoted in said bail, a counter weight for the dipper, a check valve hinged in the bottom of the dipper, an adjustable tilting frame in the receptacle in the path of the dipper, an adjustable stop extending from the stopper in the path of said bail.

5. In a dispensing apparatus the combination of a receptacle, a measuring vessel having an outlet opening connected to one side of said receptacle, a stopper at the top of the receptacle, a lifting rod slidably guided in said stopper, a bail extending from said rod, a dipper suspended from the bail, means to maintain the dipper in an upright position when not at the upper end of its stroke, a tilting frame in said receptacle in the path of the dipper, a tubular guide extending up from the stopper for said lifting rod, a sheave journaled in the upper end of the tubular guide and a chain extending from said rod over said sheave to reciprocate said rod and thereby the dipper.

6. In a fluid dispensing apparatus the combination of a receptacle, a dipper suspended therein, means to reciprocate the dipper, means to tilt the dipper at the upper end of its stroke to a predetermined angle, a measuring vessel having index lines detachably connected to the receptacle, a spout having an opening extending from the measuring vessel, a vessel below the receptacle practically air tight therewith, a tank for the fluid in the latter vessel.

7. In a dispensing apparatus the combination of a receptacle, a stopper connected to the upper portion thereof, supporting braces for the stopper to take the weight thereof from the receptacle, a tubular guide supported in the stopper, a cross head in the said guide, a lifting rod connected to the cross head and extending through the stopper into said receptacle, a bail extending from said rod, a dipper suspended in the bail, means to reciprocate the cross head, a tilting frame adjustably connected with said stopper, an adjustable tilting bar for the tilting frame in the path of the dipper, an adjustable stop for the bail extending from said stopper and a cleaning washer extending from the tilting frame and surrounding the lifting rod.

8. In a dispensing apparatus the combination of a receptacle, a stopper at the upper end thereof, a tubular guide having an opening at its lower end extending from the stopper, a cross head slidably located in said guide, a dust sleeve having an opening at the lower end of said guide, means to register said openings with each other, a lifting rod extending from the cross head, a bail extending from said rod, a dipper suspended in the bail, a tilting frame extending from said stopper into the receptacle and in the path of the dipper, an adjustable tilting bar for the frame and an adjustable stop for the bail in threaded engagement with the stopper and extending into the tubular guide opposite the opening therein.

9. In a dispensing apparatus the combination of a receptacle, a measuring vessel detachably connected thereto, a spout having an opening extending from the said vessel, a band having an opening extending around said spout, a stopper at the upper end of the receptacle, a lifting rod slidably located in the stopper, a bail extending from the rod, a dipper suspended from the bail, means to tilt the dipper, a swinging check valve in the dipper and means to limit the swing of said check valve to insure its closure upon its ascent.

Signed at the borough of Manhattan in the county of New York and State of New York this 6th day of July A. D. 1911.

WALTER STELLARD. [L. S.]

Witnesses:
FRANKLIN GRADY,
A. A. DE BONNEVILLE.